United States Patent
Salisbury et al.

(10) Patent No.: US 8,936,290 B1
(45) Date of Patent: Jan. 20, 2015

(54) ROBOTIC HAND WITH MODULAR EXTENSIONS

(71) Applicants: Sandia Corporation, Albuquerque, NM (US); The Board of Trustees of The Leland Stanford Junior University, Palo Alto, CA (US)

(72) Inventors: Curt Michael Salisbury, Albuquerque, NM (US); Morgan Quigley, Palo Alto, CA (US)

(73) Assignee: Sandia Corporation, Albuquerque, NM (US)

( * ) Notice: Subject to any disclaimer, the term of this patent is extended or adjusted under 35 U.S.C. 154(b) by 0 days.

(21) Appl. No.: 13/951,347

(22) Filed: Jul. 25, 2013

Related U.S. Application Data (60) Provisional application No. 61/694,566, filed on Aug. 29, 2012.

(51) Int. Cl.
*B25J 15/10* (2006.01)
*B25J 15/00* (2006.01)

(52) U.S. Cl.
CPC .......... *B25J 15/0009* (2013.01); *Y10S 294/907* (2013.01); *Y10S 901/36* (2013.01); *Y10S 901/46* (2013.01)
USPC ................ 294/111; 294/907; 901/36; 901/46

(58) Field of Classification Search
USPC ............ 294/106, 111, 115, 116, 907; 901/32, 901/35, 36–39, 46; 623/57, 61, 64
See application file for complete search history.

(56) References Cited

U.S. PATENT DOCUMENTS

| | | | | | |
|---|---|---|---|---|---|
| 4,620,362 | A | * | 11/1986 | Reynolds | 901/34 |
| 5,378,033 | A | * | 1/1995 | Guo et al. | 294/116 |
| 5,570,920 | A | * | 11/1996 | Crisman et al. | 294/111 |
| 6,517,132 | B2 | * | 2/2003 | Matsuda et al. | 294/106 |
| 6,913,627 | B2 | | 7/2005 | Matsuda | |
| 7,296,835 | B2 | * | 11/2007 | Blackwell et al. | 294/111 |
| 7,361,197 | B2 | * | 4/2008 | Winfrey | 623/64 |
| 7,370,896 | B2 | | 5/2008 | Anderson et al. | |
| 8,100,451 | B2 | | 1/2012 | Okuda et al. | |
| 8,276,957 | B2 | | 10/2012 | Shibamoto et al. | |
| 2010/0259057 | A1 | | 10/2010 | Madhani | |
| 2011/0017008 | A1 | | 1/2011 | Kanayama | |
| 2011/0068593 | A1 | | 3/2011 | Meusel et al. | |
| 2011/0163561 | A1 | * | 7/2011 | Kim et al. | 294/111 |

* cited by examiner

*Primary Examiner* — Paul T Chin
(74) *Attorney, Agent, or Firm* — Daniel J. Jenkins (57) ABSTRACT

A robotic device is described herein. The robotic device includes a frame that comprises a plurality of receiving regions that are configured to receive a respective plurality of modular robotic extensions. The modular robotic extensions are removably attachable to the frame at the respective receiving regions by way of respective mechanical fuses. Each mechanical fuse is configured to trip when a respective modular robotic extension experiences a predefined load condition, such that the respective modular robotic extension detaches from the frame when the load condition is met.

18 Claims, 11 Drawing Sheets

ROBOTIC HAND WITH MODULAR EXTENSIONS

RELATED APPLICATION

This application claims priority to U.S. Provisional Patent Application No. 61/694,566, filed on Aug. 29, 2012, and entitled "MODULAR ROBOT MANIPULATORS," the entirety of which is incorporated herein by reference.

STATEMENT OF GOVERNMENTAL INTEREST

This invention was made with Government support under Contract No. DE-AC04-94AL85000 awarded by the U.S. Department of Energy. The U.S. Government has certain rights in this invention.

BACKGROUND

The term "improvised explosive device" (IED) is used to describe bombs that are constructed and deployed in ways other than in conventional military applications. Often, an IED is placed on or near a roadway and is configured to detonate when a vehicle passes over the IED or proximate to the IED. Accordingly, locating IEDs prior to detonation is a critical task. There are currently several suitable techniques for locating/identifying IEDs prior to detonation. Typically, after an IED has been located, the IED is caused to be detonated after an area proximate thereto has been secured, such that damage caused by the IED is controlled.

Oftentimes, however, rather than detonating the IED, it may be desirable to disarm the IED, which may be useful in identifying techniques used by the IED maker, and thus may be of use in locating the IED maker. Further, disarming an IED (rather than detonating the IED) prevents infrastructure from becoming damaged. Conventional techniques for disarming IEDs, however, are suboptimal. Specifically, robotics have been deployed to disarm IEDs; however, conventional robotics are prohibitively expensive. For instance, a conventional robotic device that is suitable for disarming IEDs may cost millions of dollars.

SUMMARY

The following is a brief summary of subject matter that is described in greater detail herein. This summary is not intended to be limiting as to the scope of the claims.

Described herein are various technologies pertaining to a robotic device which can be, in an exemplary embodiment, a robotic hand. It is to be appreciated that aspects described herein may also be particularly well suited for other form factors, including arms, feet, etc. In an exemplary embodiment, the robotic hand can comprise a frame that includes a plurality of receiving regions, wherein each receiving region comprises respective electrical contacts. The robotic hand further comprises a plurality of modular extensions (fingers) that are removably attachable to the frame at the respective receiving regions. Each modular extension includes respective electrical contacts that connect with the electrical contacts at the receiving regions of the frame, thereby electrically connecting processing electronics in the frame with actuators in the extensions.

An extension is coupled to the frame by way of a mechanical fuse that is configured to trip when a normal force and/or a sheer force between a receiving region of the frame and a corresponding extension exceeds a predefined threshold. That is, when a predefined load condition experienced by an extension (when attached to the frame) is met, the modular extension detaches from the frame—without damaging the frame, the modular extension, or other modular extensions attached to the frame. Further, it is to be understood that detachment of an extension from the frame does not impact the operation of other extensions that remain attached to the frame.

In an exemplary embodiment, magnets can be employed as the mechanical fuse, thereby allowing for relatively easy detachment and re-attachment of a modular extension to the frame of the robotic hand. In another exemplary embodiment, the mechanical fuse may be an adhesive that can form a bond between the frame and an extension coupled thereto. The adhesive can be selected such that the extension detaches from the frame when a threshold amount of normal and/or sheer force is applied at a region where the module extension is bonded to the frame.

An exemplary modular extension that can be removably attachable to the frame of the robotic hand may be in the general form of a human finger. In an exemplary embodiment, the modular robotic finger can comprise three links: a base link, a proximal link that is coupled to the base link, and a distal link that is coupled to the proximal link, such that the proximal link is between the base link and the distal link. When the modular robotic finger is attached to the frame, the base link is coupled to a respective receiving region by way of the mechanical fuse. The base link is coupled to the proximal link by way of a first joint and a second joint, wherein the first joint supports adduction and abduction, and the second joint supports flexion and extension. The third joint couples the proximal link to the distal link, and supports flexion and extension. Accordingly, each modular robotic finger can have at least three degrees of freedom associated therewith. In contrast to conventional robotic designs, the modular robotic finger (e.g., the base link) comprises actuators that are configured to facilitate the aforementioned motion. In an exemplary embodiment, the base link of the modular robotic finger can comprise three motors: a first motor that supports the adduction and abduction, a second motor that supports the flexion and extension corresponding to the second joint, and a third motor that supports the flexion and extension corresponding to the third joint. In an exemplary embodiment, the frame can comprise control circuitry that transmits control signals to the motors, wherein the motors receive the control signals by way of the electrical connection formed when the electrical contacts of the modular robotic finger contact the electrical contacts of a respective receiving region of the frame.

Furthermore, in an exemplary embodiment, the base link can comprise a rotating module that is driven by a motor. The rotating module can comprise a planetary gearhead and a capstan, wherein the capstan is wrapped around a ring gear of the planetary gearhead, thereby allowing the ring gear to rotate relative to the motor. This motion drives a cable coupled to the capstan, which in turn moves the extensions about the joints. The rotating module is compact in nature, allowing for multiple rotating modules to be included in the base link of modular robotic finger rather than in the frame. Each motor in the base link of the extension drives a respective cable, wherein the respective moves a respective link about a respective joint.

Further, in an exemplary embodiment, the cabling can be steel cabling and can act as a transmission line that transmits electric power from the control circuitry to at least one sensor in the modular robotic finger. Further, the steel cabling can act as a data transmission line for transmitting data output by the sensor to the control circuitry in the frame. Utilization of the steel cabling as both mechanical cabling and conductive cabling reduces an amount of wiring that is run through the frame and the modular robotic fingers of the robotic hand, thus reducing complexity and cost of the robotic hand.

Further, in an exemplary embodiment, the frame of the robotic hand can comprise a plurality of cameras and a projector for emitting structured light. For instance, the frame of the hand can be positioned such that structured light is emitted from the projector to an object of interest (e.g., an IED), and the plurality of cameras can be arranged in the frame in a stereoscopic manner, thereby facilitating generation of a three-dimensional point cloud that is representative of depth of the object from the robotic hand. This information can be transmitted to a remote station, and an operator can control the robotic hand based at least in part upon this information.

Furthermore, while the modular extensions have been described above as being modular robotic fingers, it is to be understood that since modular extensions can be readily attached and removed from the frame (e.g., hot-swapped), the modular extensions may be designed to perform other functions. Pursuant to an example, the frame of the robotic hand may comprise four receiving regions for receiving respective four modular extensions. A first modular extension may be in the form of a human finger. A second modular extension may have functionality of a drill. A third modular extension may have functionality of a flashlight. A fourth modular extension may have functionality of scissors. Thus, it can be ascertained that a frame can be configured to receive several modular extensions that are designed to perform distinct functions. Additionally, while the robotic hand has been described above as being particularly well-suited for applications in connection with dismantling IEDs, it is to be understood that features described herein may be particularly well-suited for a variety of applications, including but not limited to prosthetics, industrial automation applications, etc.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 5I is a side view of the exemplary modular extension.

DETAILED DESCRIPTION

Various technologies pertaining to a robotic hand are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein are various technologies pertaining to a robotic device that comprises a plurality of modular extensions. The examples herein depict the robotic device as being a robotic hand. It is to be understood, however, that features described herein may be applicable in connection with other robotic devices, such as arms, legs, etc. Moreover, features described herein may be readily applicable to robotic devices that are not analogous to a portion of the human anatomy. Furthermore, while the exemplary robotic hand shown and described herein includes a particular number of extensions (e.g., four), it is be understood that the robotic hand may include any suitable number of modular extensions. For instance, the robotic hand can comprise five modular extensions, which can be analogous to the four fingers and thumb of a typical human hand. Of course, the robotic hand may also include a greater or smaller number of modular extensions. Still further, while the exemplary modular extensions shown and described herein are analogous to human fingers, it is to be understood that one or more extensions that are removably attachable to a frame of the robotic hand may not be analogous to human fingers. For instance, a modular extension may be have particular functionality, such that it may act as a flashlight, a drill, scissors, etc.

Figure 1:
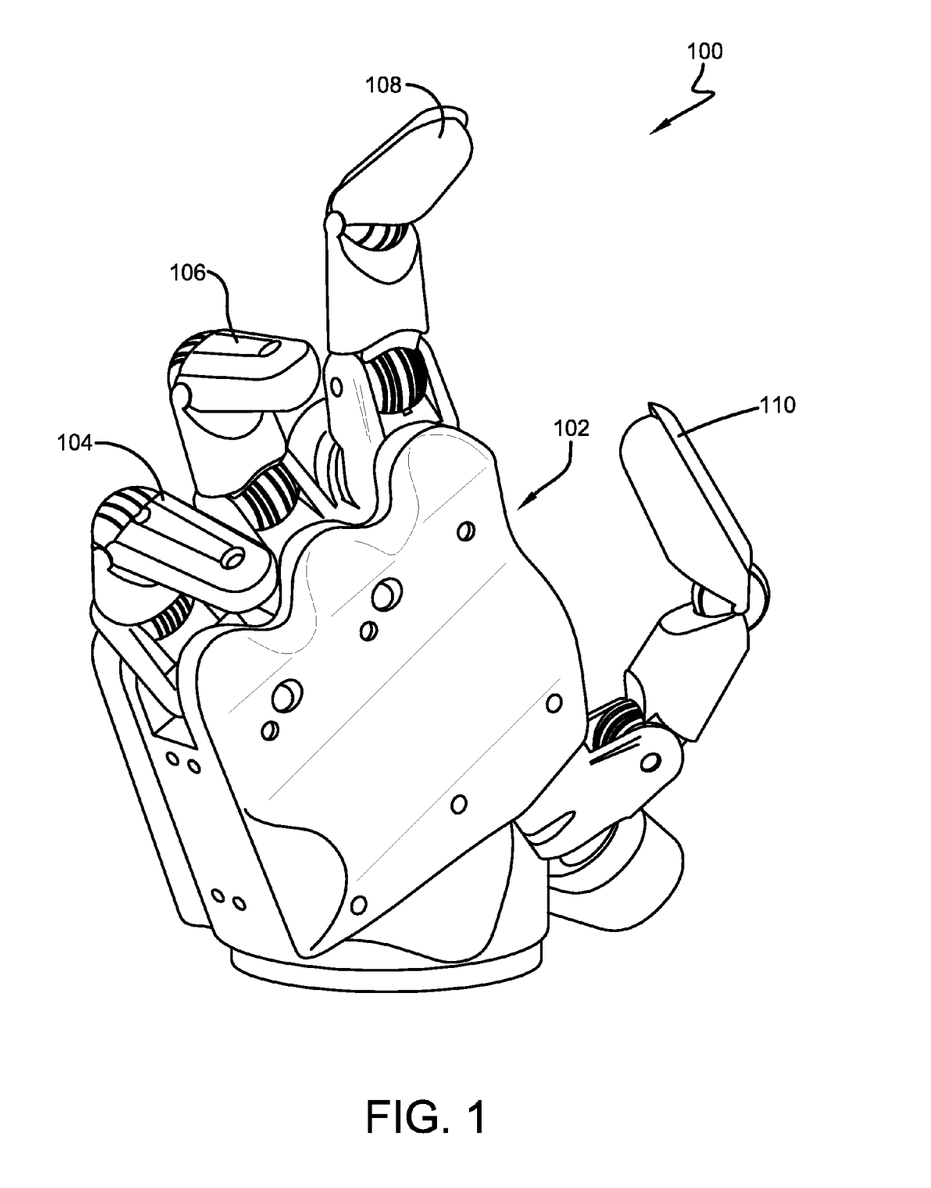
FIG. 1 is a perspective view of an exemplary robotic hand.

With reference now to FIG. 1, a perspective view of an exemplary robotic hand 100 is illustrated. The robotic hand 100 comprises a frame 102. As will be described in greater detail herein, the frame 102 comprises a plurality of receiving regions (not shown). Each receiving region of the frame 102 can comprise respective electrical contacts, which, in an exemplary embodiment, may be spring contacts (rather than connectors).

The robotic hand 100 further comprises a plurality of modular robotic fingers 104-110 that are removably attachable to the frame 102 at the respective receiving regions of the frame 102. As will be shown and described in greater detail herein, actuators that are configured to cause robotic links of a respective modular robotic finger can be located in the modular robotic finger, rather than in the frame 102. Accordingly, the shape of the frame 102 can be relatively unrestricted, such that it can be configured to support various positions of the modular robotic fingers 104-110 when attached to the frame 102, can support more or fewer modular robotic fingers, etc.

Each modular robotic finger in the plurality of modular robotic fingers 104-110 comprises respective electrical contacts that contact respective electrical contacts of the frame 102 when a modular robotic finger is attached to the frame 102. For example, the frame 102 can comprise a first receiving region that includes first electrical contacts. The first modular robotic finger 104 can be removably attached to the frame 102 at the first receiving region. The first modular robotic finger 104 includes second electrical contacts that contact the first electrical contacts of the first receiving region of the frame 102 when the first modular robotic finger 104 is coupled to the frame 102 at the first receiving region. Accordingly, an electrical connection is formed between control circuitry included in the frame 102 and at least one actuator in the first modular robotic finger 104. In an exemplary embodiment, electrical contacts of the first modular robotic finger 104 and/or of the first receiving region of the frame 102 may be electrical spring contacts. Accordingly, the electrical connection formed between the actuator of the first modular robotic finger 104 and the control circuitry of the frame 102 does not impede detachment of the first modular robotic finger 104 from the frame 102.

The modular robotic fingers in the plurality of robotic modular fingers 104-110 are removably attachable to the frame 102 at the respective receiving regions of the frame 102 by way of respective mechanical fuses, wherein a mechanical fuse is configured to trigger (break) when a corresponding modular robotic finger experiences a predefined load condition. For example, the first modular robotic finger 104 can be coupled to the first receiving region of the frame 102 by way of a first mechanical fuse, wherein the first mechanical fuse is configured to trigger/break upon the first modular robotic finger 104 experiencing a predefined load condition. In an exemplary embodiment, the mechanical fuse can be configured to trigger when a normal force between the frame 102 and the first modular robotic finger 104 at the first receiving region exceeds a predefined threshold, thereby causing the first modular robotic finger 104 to detach from the frame 102. In another exemplary embodiment, the first mechanical fuse can be configured to trigger/break when a shear/lateral force between the frame 102 and the first modular robotic finger 104 at the first receiving region exceeds a predefined threshold, thereby causing the first modular finger 104 to detach from the frame 102.

In an exemplary embodiment, the mechanical fuse can be formed through utilization of magnets. Specifically, a first magnet having a first polarity can be positioned in the first receiving region of the frame 102, and a second magnet having a second polarity (opposite the first polarity) can be positioned in a base link of the first modular robotic finger 104, thereby forming a mechanical fuse between the base link of the first modular robotic finger 104 and the frame 102. Utilization of magnets to form the mechanical fuse allows for the modular robotic fingers 104-110 to be readily removed and/or attached from the frame 102, without causing damage to either the modular robotic fingers 104-110 or the frame 102. Other mechanical fuses, however, are also contemplated. For instance, a relatively fast bonding adhesive can be used to mechanically bond a modular robotic finger to the frame 102, wherein the bond is configured to break if the modular robotic finger experiences a load condition above a threshold.

Figure 2:
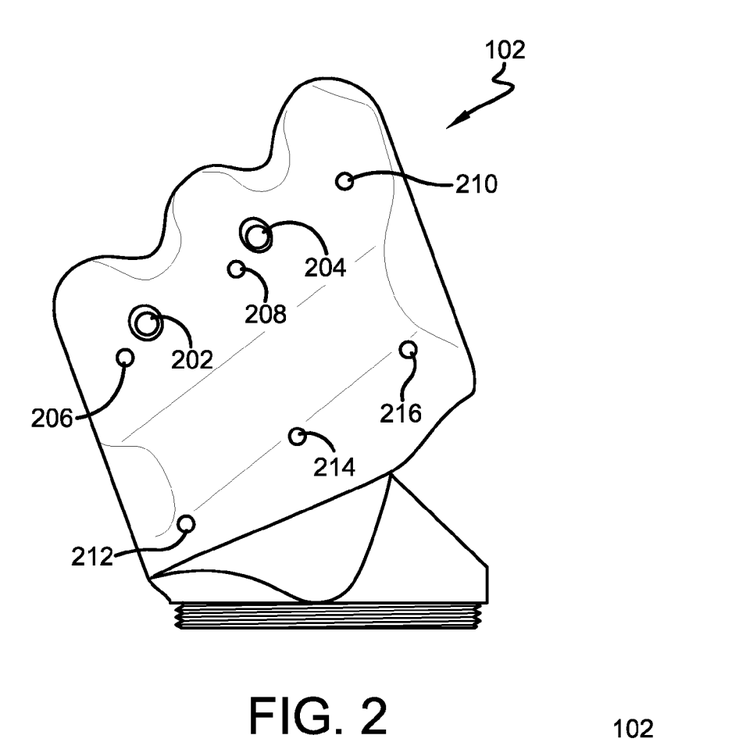
FIG. 2 is a front view of a frame of the exemplary robotic hand.

Now referring to FIG. 2, a front view of the frame 102 is illustrated. As can be ascertained, the frame 102 can be generally in the shape of a human palm. As there is a relatively small amount of electronic circuitry in the frame 102, however, it is to be understood that the frame 102 can be of a variety of different shapes. The frame 102 can comprise a plurality of cameras 202-204. The cameras 202-204 may, in an exemplary embodiment, capture images at video rate (e.g., the cameras 202-204 may be video cameras). As can be ascertained, the cameras 202-204 can be stereoscopically arranged. The cameras 202-204 can be synchronized, such that a pair of images captured by the cameras 202-204 is generated at substantially the same time. A pair of images that capture an object can be analyzed to ascertain depth of the object from the cameras 202-204, and thus depth of the object from the frame 102 and/or modular robotic fingers 104-110.

Additionally, the frame 102 can include or have coupled thereto a projector (not shown) that is configured to emit structured light. In an exemplary embodiment, the structured light can be in the visible spectrum and can be in the form of a grid or other suitable structure. The cameras 202-204 can thus capture images of an object, wherein the structured light is projected on such object. Control circuitry in the frame 102 (e.g., a motherboard) can be employed to process such images and generate a 3D point cloud corresponding to the object based upon the structured light projected onto the object and captured in the images. In another exemplary embodiment, the projector may be an infrared (IR) emitter, and the frame 102 can include at least one IR camera (e.g., at least one camera in the plurality of cameras 202-204 may be an IR camera). In yet another exemplary embodiment, the frame 102 can include an ultrasound (US) emitter, as well as a sensor for detecting reflected US waves. Thus, it can be ascertained that the frame 102 is configured to include at least one color (red-green-blue) camera, as well as a depth sensor. Images captured by the camera and depth data generated by the depth sensor can be employed to create the 3D point cloud, thereby allowing an operator of the robotic hand 100 to ascertain a distance between the frame 102 and/or at least one modular finger and an object that is desirably grasped (or touched) by the robotic hand 100. In other exemplary embodiments, at least one of the modular robotic fingers 104-110 can include a camera and/or depth sensor.

The frame 102 may also include a variety of other sensors including, but not limited to, a velocity sensor, a three-dimensional accelerometer, a three-dimensional magnetometer, a three-dimensional gyroscope, a tactile sensor array that can indicate when the frame 102 comes into contact with an object, amongst other sensors. Additionally, the frame 102 can include an antenna and/or a communications port that facilitates receipt of control commands from a remotely situated control center. With more particularity, as referenced above, the frame 102 can comprise control circuitry (e.g., a motherboard, a CPU, a GPU, an ASIC, a FPGA, . . . ). The control circuitry has an antenna associated therewith that can receive control commands from a remotely situated control center. The control circuitry, responsive to receipt of the control commands, can process such commands and transmit at least one control signal to at least one actuator in a modular finger based upon the control commands. Accordingly, the robotic hand 100 can be controlled from a remote location, thereby facilitating, for instance, disablement of an IED without requiring the operator to be proximate to the IED.

The frame 102 may also include a plurality of apertures (e.g., which may be at least partially threaded) that are configured to receive threaded fasteners. Likewise, the modular robotic fingers 104-108 may include (at least partially) threaded apertures that align with the threaded apertures 206-216 when the modular robotic fingers 104-108 are attached to the frame 102. Thus, in an example, a threaded fastener can pass through the aperture 206, such that a threaded end of the threaded fastener extends beyond the backside of the frame 102. The threaded fastener is then threaded into the threaded aperture of the first modular robotic finger 104, thereby more permanently fastening the first modular robotic finger 104 to the frame 102. The threaded fasteners can be utilized in situations when it is not desirable for the modular robotic fingers 104-110 to detach from the frame 102.

Moreover, as referenced above, the frame 102 includes control circuitry that transmits control commands to actuators of modular fingers that are attached to the frame 102. Furthermore, the control circuitry receives images output by the cameras 202-204 as well as depth data generated by the depth sensor. The control circuitry analyzes such data to generate a three-dimensional point cloud. The control circuitry selectively transmits control commands to actuators of attached modular fingers, which causes the actuators to perform predefined functions. In an exemplary embodiment, the actuators can be electrically coupled in parallel with one another, thereby allowing actuators to be the same in and across the modular robotic fingers 104-110.

Figure 3:
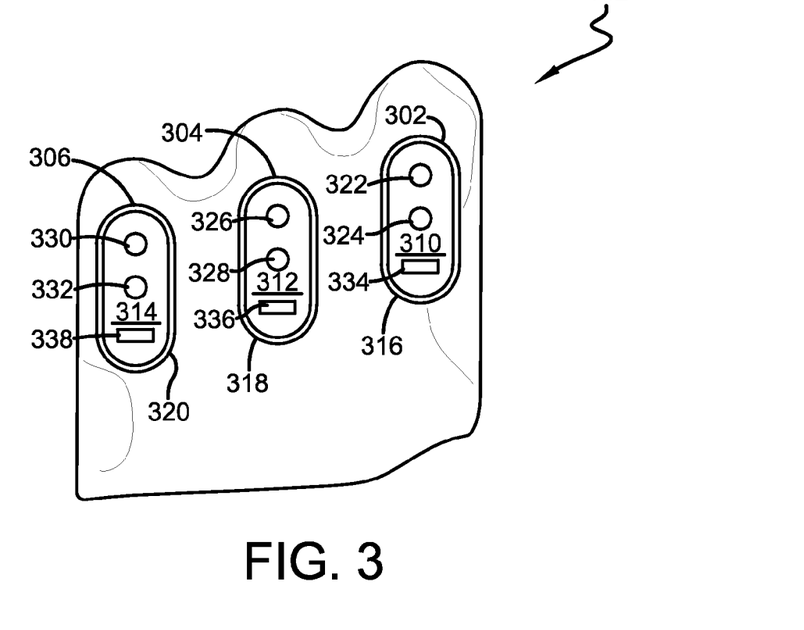
FIG. 3 is a rear view of the frame of the exemplary robotic hand.

With reference now to FIG. 3, an exemplary back view of the frame 102 of the robotic hand 100 is illustrated. The frame 102 includes a plurality of receiving regions 302-306. In an example, the back side of the frame 102 can include a planar rear surface 308. The receiving regions 302-306 can comprise recesses 310-314, which are respectably recessed from the rear planar surface 308. Depths of the recesses 310-314 relative to the rear planar surface 308 can be respectively selected based upon a predefined load condition associated with detachment of the modular robotic fingers 104-108 from the frame 102. For example, as the depth of the recesses 310-314 increases relative to the rear planar surface, the lateral force that can be applied to the modular robotic fingers 104-108 (that are respectively attached to the frame 102 at the receiving regions 302-306) needed to cause the modular robotic fingers 104-108 to detach from the frame 102 likewise increases. As will be shown below, the modular robotic fingers 104-108 can comprise protrusions that respectively correspond to the recesses 310-314 of the receiving regions 302-306.

The receiving regions 302-306 may further comprise respective sidewalls 316-320, wherein respective slopes of the sidewalls 316-320 can be selected based upon the desired predefined load condition that, when applied to the modular fingers 104-108, causes the modular fingers 104-108 to detach from the frame 102. For instance, as steepness of the sidewalls 316-320 increases, the lateral force needed to be applied to the modular fingers 104-108 to cause such modular fingers 104-108 to detach from the frame 102 likewise increases.

The receiving regions 302-306 can also each comprise a respective plurality of magnets. More specifically, the first receiving region 302 can comprise a first plurality of magnets 322-324, the second receiving region 304 can comprise a second plurality of magnets 326-328, and the third receiving region 306 can comprise a third plurality of magnets 330-332. The modular robotic fingers 104-108 can comprise respective pluralities of magnets of polarities opposing the polarities of the magnets in the receiving regions 302-306, such that when the modular robotic fingers 104-108 are respectively attached to the frame 102 at the receiving regions 302-306, the modular robotic fingers 104-108 remain attached unless the predefined load condition is met.

The plurality of receiving regions 302-306 can further comprise respective electrical contacts 334-338, wherein the electrical contacts 334-338 are electrically coupled to the control circuitry included in the frame 102. The modular robotic fingers 104-108 have corresponding electrical contacts thereon, such that when the modular robotic fingers 104-108 are attached to the frame 102 at the respective receiving regions 302-306, the electrical contacts 334-338 of the receiving regions 302-306 contact corresponding electrical contacts of the modular robotic fingers 104-108. When the electrical contacts in the frame 102 contact electrical contacts of the modular robotic fingers 104-108, electrical connections are formed between the control circuitry in the frame 102 and actuators in the modular robotic fingers 104-108. Additionally, when electrical contacts in the frame 102 contact corresponding electrical contacts of the modular robotic fingers 104-108, a communications channel between sensors in the modular robotic fingers 104-108 and the control circuitry of the frame 102 is formed.

While not shown in FIG. 3, another receiving region can be located on the side or bottom of the frame 102 for receiving another modular robotic finger. Further, the frame 102 can be composed of any suitable material, including a plastic, a metal, or the like. As indicated above, the actuators for moving links of the modular robotic fingers 104-110 are included in the modular robotic fingers 104-110 themselves, thereby allowing the frame 102 to have a relatively small footprint. Further, as the modular robotic fingers 104-110 are configured to be relatively easily detached (and re-attached) to the frame 102, expensive damage is not caused if the fingers are subjected to a relatively large load condition (e.g., the modular robotic fingers 104-110 detach from the frame 102, thereby preventing damage to the modular robotic fingers 104-110 and/or the frame).

Figure 4:
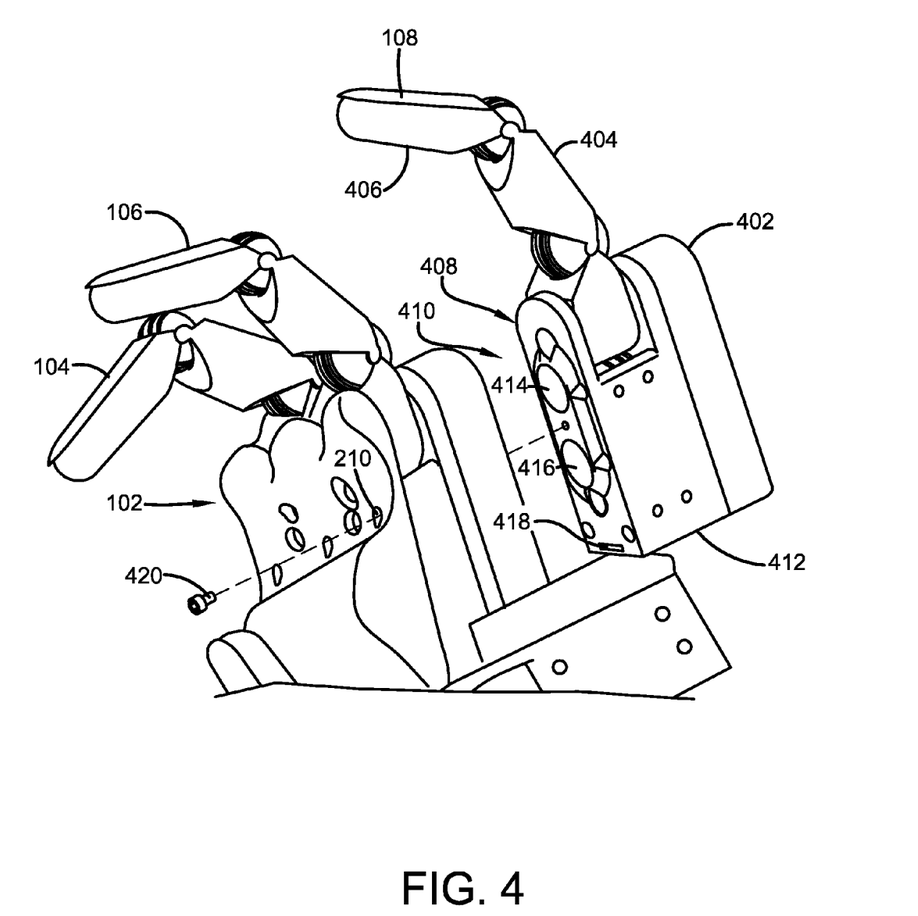
FIG. 4 is a perspective view of a modular extension being attached to or removed from the frame of the robotic hand.

Now referring to FIG. 4, a perspective view of the third modular robotic finger 108 being attached to the frame 102 is illustrated. The third modular robotic finger 108 (and other modular robotic fingers) comprises a plurality of robotic links: a base link 402, a proximal link 404, and a distal link 406. As will be shown and described herein, the base link 402 comprises actuators that drive movement of the proximal link 404 and the distal link 406 about joints of the third modular robotic finger 108. The base link 402 comprises a front planar surface 408. A protrusion 410 extends from the front planar surface 408, wherein height of the protrusion 410 relative to the front planar surface 408 corresponds with the depth of the third recess 314 of the third receiving region 306 of the frame 102. Furthermore, shape of the protrusion 410 corresponds with the shape of the third recess 314. The protrusion 410 has a sidewall 412 with a slope that corresponds to the slope of the sidewall 320 of the third receiving region 306.

The protrusion 410 further includes a plurality of magnets 414-416 of polarities that respectively oppose polarities of the magnets 330-332 of the third receiving region 306. The base link 402 also comprises electrical contacts 418 that extend from the front planar surface 410, wherein the electrical contacts 418 are configured to contact the third electrical contacts 338 in the third receiving region 306 when the third modular robotic finger 108 is attached to the frame 102 at the third receiving region 306. If it is desirable to more permanently attach the third modular robotic finger 108 to the frame 102, then a threaded fastener 420 can be passed through the aperture 210 of the frame 102 and can be threaded into a corresponding threaded aperture in the protrusion 410 of the base link 402.

Figures 5A, 5B:
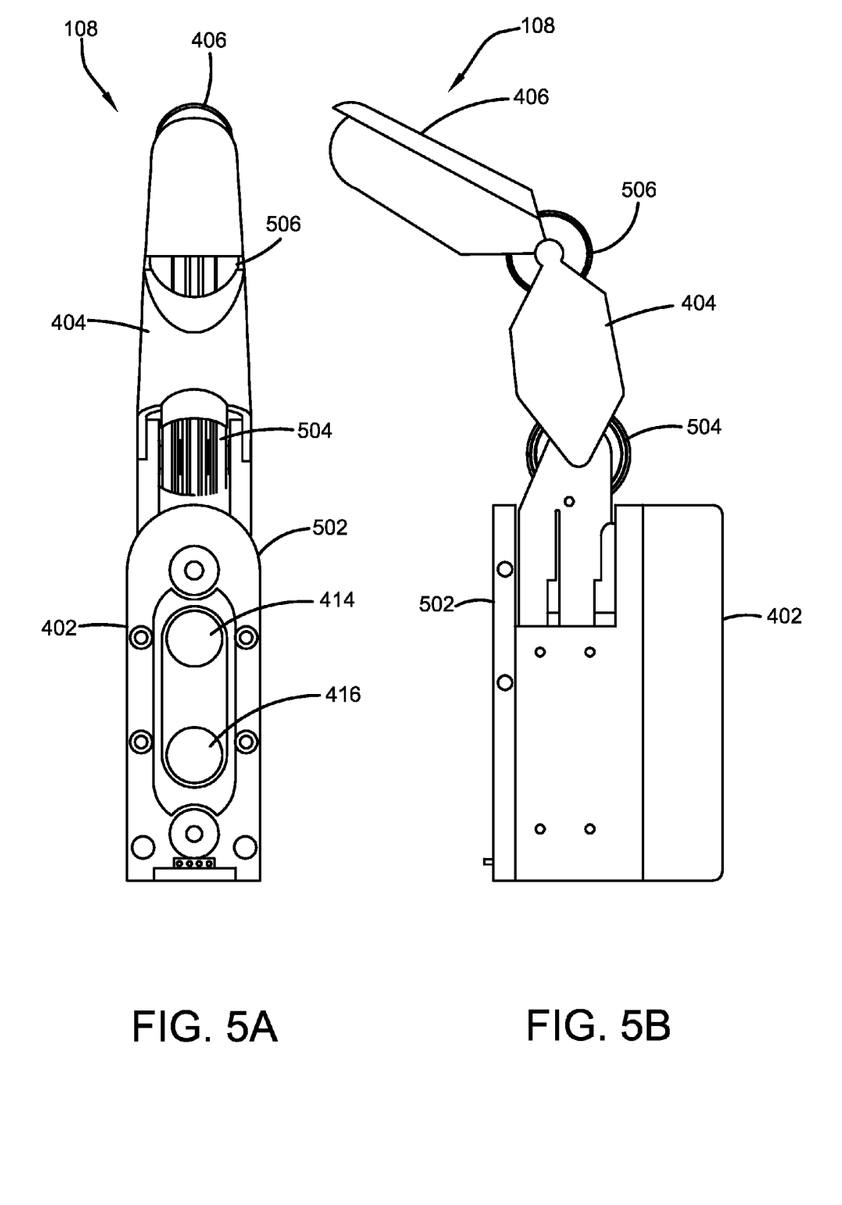
FIG. 5A is a front view of an exemplary modular extension that can be coupled to the frame of the robotic hand.

Turning now to FIG. 5A, a front view of the third modular robotic finger 108 is illustrated. As indicated above, the third modular robotic finger 108 includes a base link 402, a proximal link 404, and a distal link 406. The modular robotic finger 108 also comprises a plurality of joints: a first joint 502 that facilitates adduction and abduction about the first joint 502, a second joint 504 that facilitates flexion and extension about the second joint 504, and a third joint 506 that facilitates flexion and tension about the third joint 506. Accordingly, the third modular robotic finger 108 has three degrees of movement. In an exemplary embodiment, the joints 502-506 can be formed of radial bearings with pins extending therethrough, such that robotic links coupled by way of a joint can move relative to one another about such joint.

With reference now to FIG. 5B, an exemplary side view of the third modular robotic finger 108 is depicted. As can be ascertained, the joints 504 and 506 support flexion and extension, while the joint 502 sports adduction and abduction.

Figure 6A:
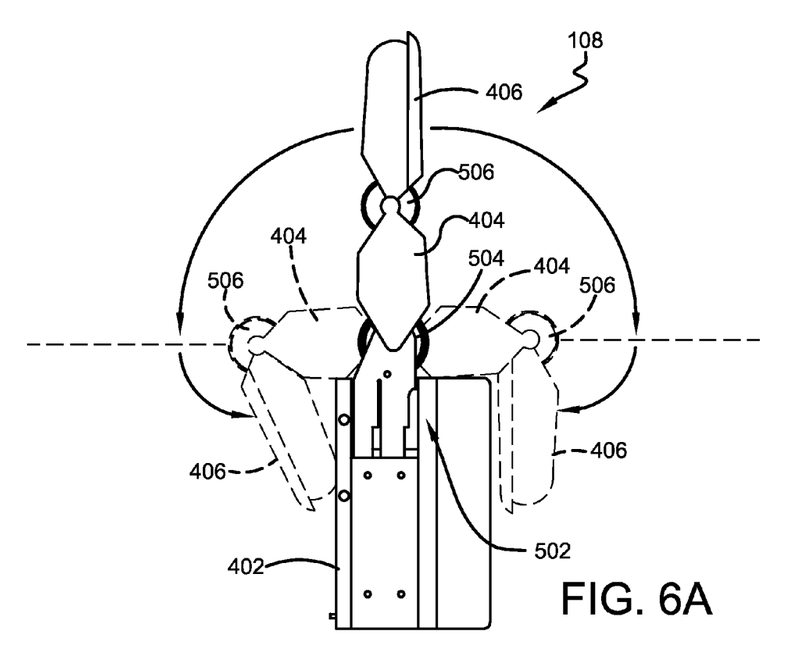
FIG. 6A is a side view of the exemplary modular extension illustrating a range of motion of the robotic links of the modular extension.

Now referring to FIG. 6A, another exemplary side view of the third modular robotic finger 108 is shown, wherein a range of motion of links of the modular robotic finger 108 are depicted. It can be ascertained that the third modular robotic finger 108 has a greater range of motion than what is supported by a human finger. For instance, the second joint 504 supports at least 180° of radial motion of the proximal link 404 relative to the base link 402. The third joint 506 supports at least 205° of radial motion of the distal link 406 relative to the proximal link 404. Thus, if desired and in connection with completion of a task, the third modular robotic finger 108 can be positioned in a manner that is not natural (or possible) for a human finger.

Figure 6B:
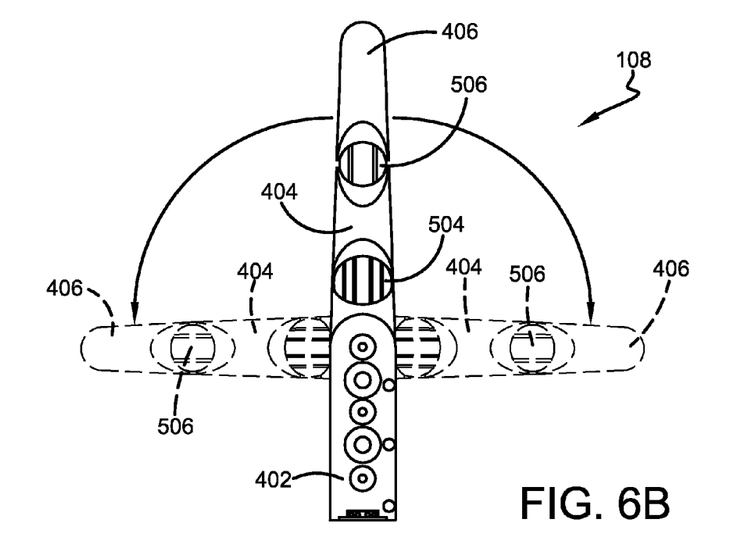
FIG. 6B is a front view of the modular extension illustrating a range of adduction and abduction of the modular extension.

With reference to FIG. 6B, a front view of the third modular robotic finger 108 is illustrated, wherein adduction and abduction supported by the first joint 502 of the modular robotic finger 108 is shown. For instance, the first joint 502 can support 180° of radial motion of the proximal link 404 relative to the base link 402.

Figure 7:
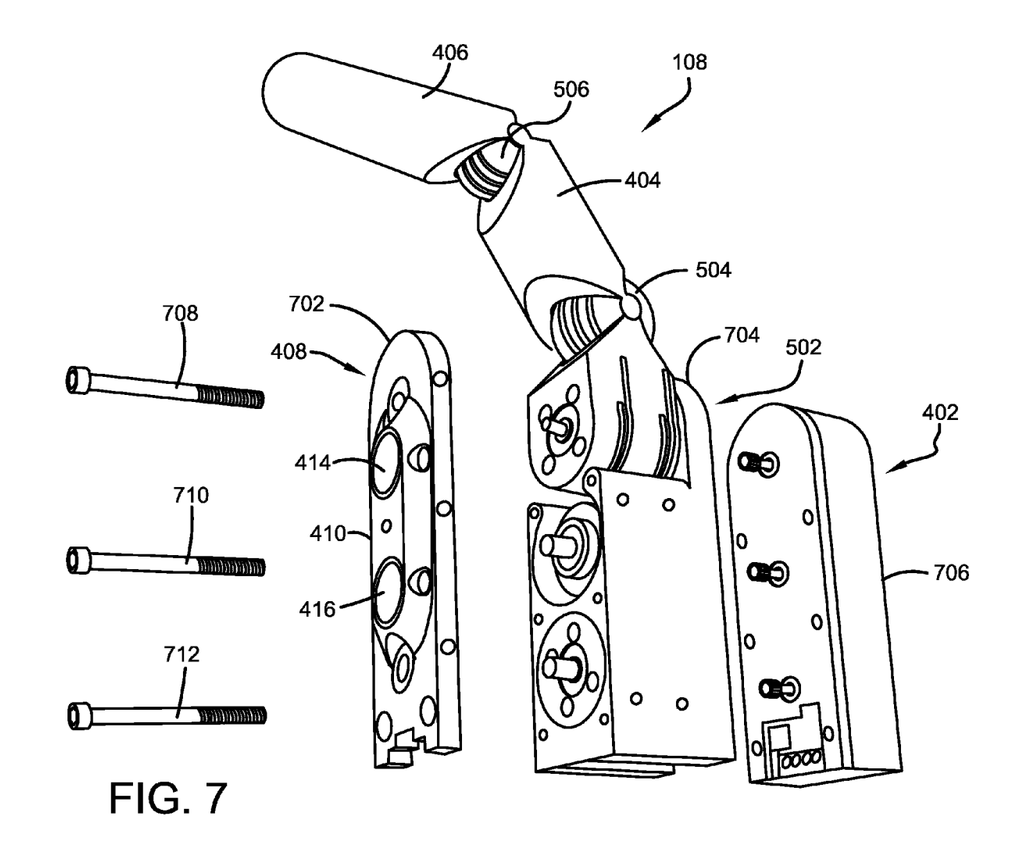
FIG. 7 is a perspective view of the modular extension.

Now referring to FIG. 7, another exemplary perspective view of the third modular robotic finger 108 is shown. As can be ascertained, the base link 402 comprises a plurality of modules. With more specificity, the base link 402 comprises a cover module 702, a gearing module 704, and a motor module 706. In an exemplary embodiment, the cover module 702, the gearing module 704, and the motor module 706 can be coupled to one another by way of a plurality of threaded fasteners 708-712. For example, while not shown, the cover module 702, the gearing module 704, and the motor module 706 can comprise apertures that align with one another when the modules 702-706 are aligned with one another. The threaded fasteners 708-712 can pass through apertures of the cover module 702 and the gearing module 704 (e.g., which may or may not be threaded apertures), and can be threaded into threaded apertures of the motor module 706, thereby relatively attaching the modules 702-706 to one another.

The cover module 702 comprises the front planar surface 408 and the magnets 414-416 that are positioned on the protrusion 410. The gearing module 502 comprises a plurality of rotating modules that respectively drive steel cabling that is coupled to the proximal link 404 and/or the distal link 506, thereby causing the proximal link 404 and/or the distal link 406 to rotate about the joints 502, 504, and 506, respectively. The motor module 706 comprises a plurality of motors that respectively drive the plurality of rotating modules. In exemplary embodiment, the plurality of motors in the motor module 706 can be grounded to a common ground in the base link 402, such that the motors in the motor module 706 can be identical.

Figure 8:
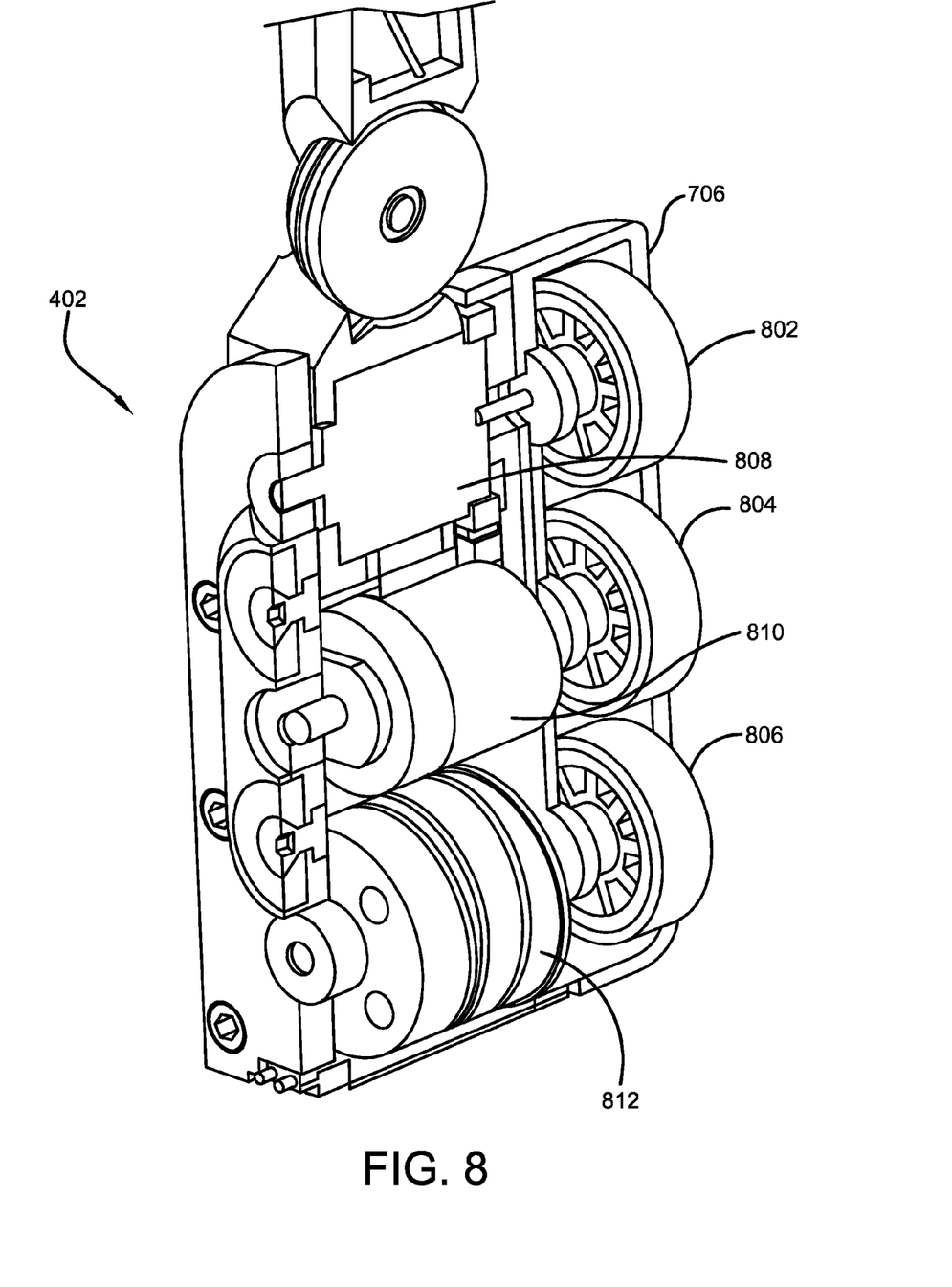
FIG. 8 is a cutaway view that illustrates componentry of a base link of the modular extension.

Turning now to FIG. 8, a cutaway view of the base link 402 of the third modular robotic finger 108 is illustrated. The base link 402 comprises the motor module 706, which includes a first motor 802, a second motor 804, and a third motor 806. In the exemplary embodiment shown in FIG. 8, the plurality of motors 802-806 are coupled to respective ring gears (not shown) that are configured to mesh with respective planetary gearheads. FIG. 8 depicts planetary gearheads 808 and 810 driven by the motors 802 and 804, respectively. Furthermore, the planetary gearhead 810 has a capstan formed thereon, wherein the capstan is used to control winding of cabling driven by the planetary gearhead 810, which causes a link of the third modular robotic finger 108 to rotate about a joint. A capstan 812 is also shown, wherein the capstan covers a planetary gearhead (not shown) that is driven by the motor 806. In other words, the motors 804 and 806 drive respective rotating modules, wherein the rotating modules comprise respective planetary gearheads and capstans formed thereon. The motor 802 drives the planetary gearhead 808, but need not include a capstan, since the planetary gearhead 808 directly rotates the proximal link 404 relative to the base link 402 about the first joint 502. The planetary gearhead 808 can have a sliding surface, such that cabling driven by the second motor 804 and the third motor 806 can slide thereover (e.g., movement of the cabling driven by the second motor 804 and the third motor 806 is not impeded by the planetary gearhead 808). Likewise, the capstan (not shown) formed on the planetary gearhead 810 can have a sliding surface, such that cabling driven by the third motor 806 is not impeded by the capstan formed on the planetary gearhead 810.

Figure 9:
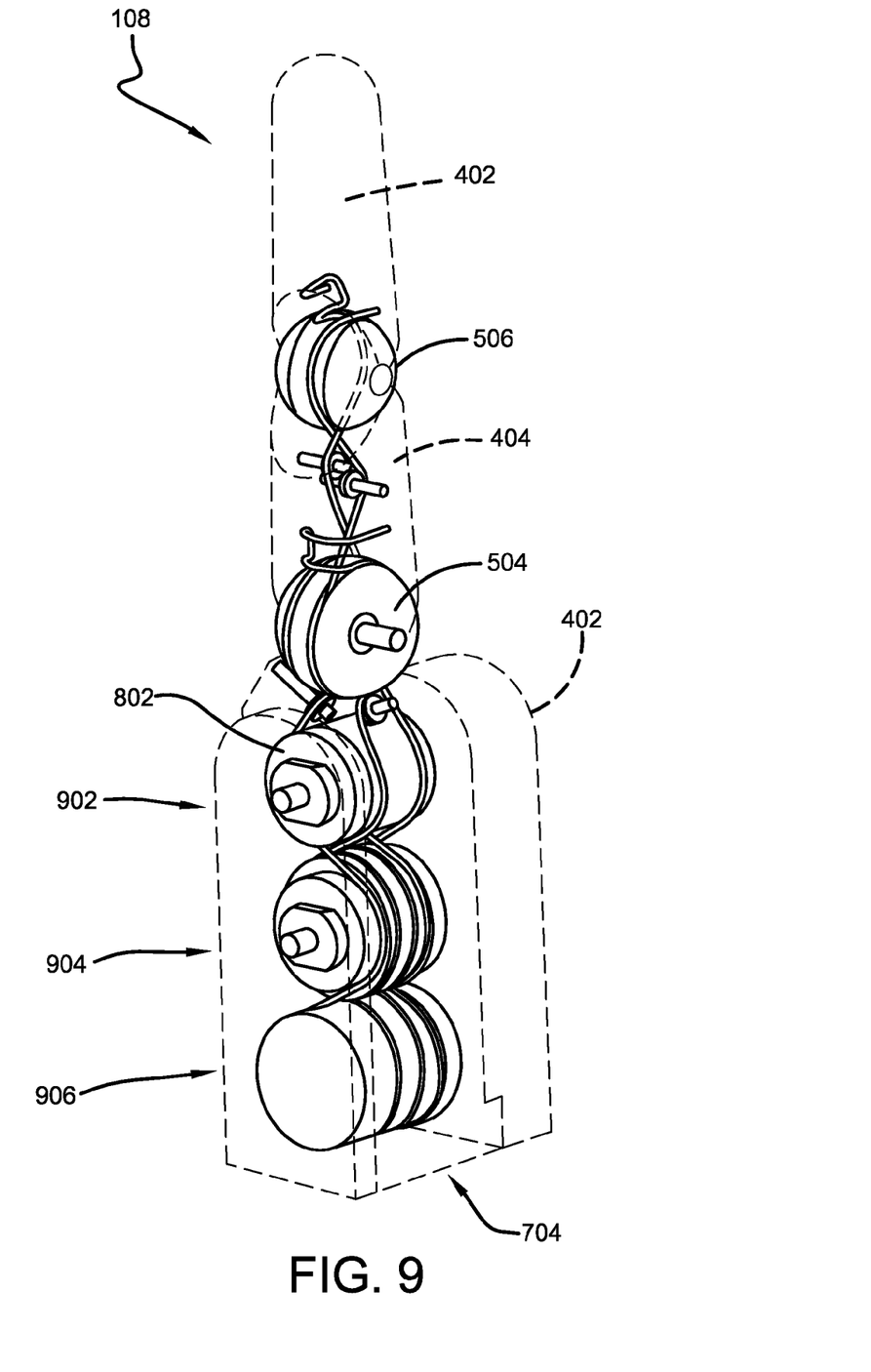
FIG. 9 illustrates a transparent view of the modular extension.

Now referring to FIG. 9, a transparent view illustrating routing of mechanical/transmission cables through the links of the third modular robotic finger 108 is illustrated. The gearing module 704 is shown as including three rotating modules 902-906, which are driven by the respective motors 802-806. The rotating module 906 is composed of a planetary gearhead with a capstan formed thereon. Likewise, the rotating module 904 is formed of a planetary gearhead with a capstan formed thereon, wherein the capstan has a sliding surface, which allows cabling driven by the rotating module 906 (which is driven by the motor 806) to slide over the surface thereof. The first rotating module 902 may act as the first joint 502, in that rotation of the first rotating module 902 causes the proximal link 404 to rotate about the base link 402 (e.g., thereby supporting adduction and abduction). The second rotating module 904 can drive a pair of steel cables that are routed about the sliding surface of the first rotating module 902 (e.g., on opposing sides thereof) and further routed through the second joint 504, coupling on opposing sides of the second joint 504. Accordingly, as the second motor 804 drives the second rotating module 904, the cabling is in turn driven, which moves the proximal link 404 about the second 504 in the appropriate direction (flexion and extension). The capstan formed on the planetary gearhead of the second rotating module 904 is used to wind excess cable, thus removing slack from the cabling.

Likewise, the third rotating module 906 is driven by the third motor 806, which drives a respective pair of mechanical cables. A capstan of the third rotating module 906 is used to remove slack from the mechanical cables driven by the third rotating module 906. The pair of cables driven by the third rotating module 906 can be routed on opposing sides of the second rotating module 904 and further routed on opposing sides of the first rotating module 902 over the respective sliding surfaces, and can further wrap about bearings throughout the third modular robotic finger 108. As shown, the mechanical cabling driven by the third rotating module 906 is coupled to opposing sides of the third joint 506, such that rotation of the third rotating module 906 in a first radial direction causes the distal link 406 to move about the third joint 506 relative to the proximal link 404 in a first radial direction, while rotation of the third rotating model 906 in the opposite direction causes the distal link 406 to rotate about the third joint 506 relative to the proximal link 404 in a second radial direction (opposite the first radial direction).

In an exemplary embodiment, the mechanical cabling that is routed through the third modular robotic finger 108 can be steel cabling that can be coupled to respective sensor arrays in the third modular robotic finger 108. For instance, it may be desirable to include an accelerometer, a Gyroscope, tactile sensors, and the like in the proximal link 404 and/or the distal link 406. To reduce wiring necessary to power such sensors and to transport data from such sensors to the control circuitry in the frame 102, the cabling can be steel cabling, copper cabling, or cabling of other suitable material that can be employed to both mechanically drive links of the third modular robotic finger 108, provide power to sensors in the third modular robotic finger 108, and transmit data output by the sensors to the control circuitry in the frame 102. Accordingly, while not shown, a sensor array may be included in the distal link 406, wherein the sensor array is coupled to the cabling that is also used to drive movement of the distal link 406 about the third joint 506. The cabling can be electrically coupled to the electrical contacts in the base link 402, such that power and data can be transmitted between the control circuitry in the frame 102 and the sensor array when the third modular robotic finger 108 is attached to the frame 102.

Similarly, cabling driven by the second rotating module 904 can be coupled to a sensor array in the proximal link 404, and can be used to rotate the proximal link 404 about the second joint 504 relative to the base link 402, and can further be used to transmit power and data between such sensor array and the control circuitry in the frame 102.

Figure 10:
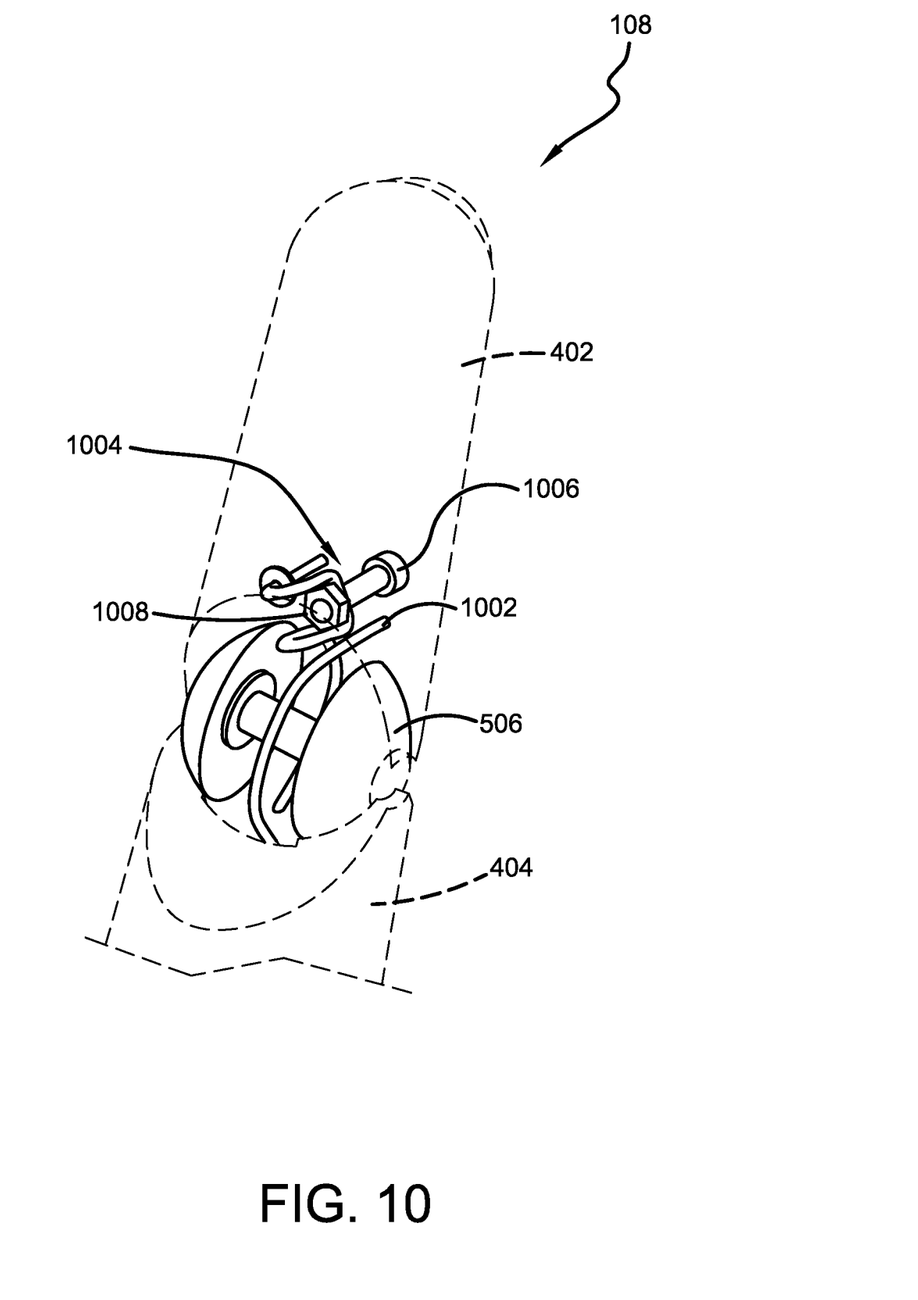
FIG. 10 illustrates a transparent view of a distal link of the modular extension.
Figure 11A:
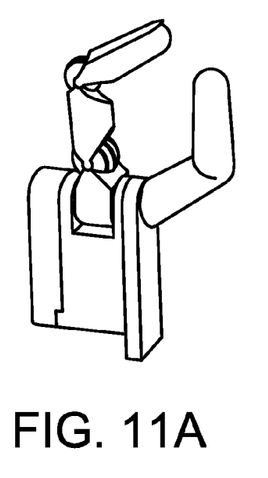
FIGS. 11A through 11F illustrate exemplary arrangements of modular extensions.
Figure 11B:
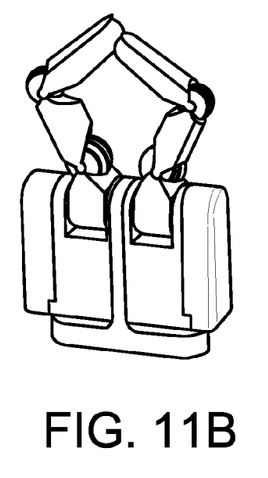
Figure 11C:
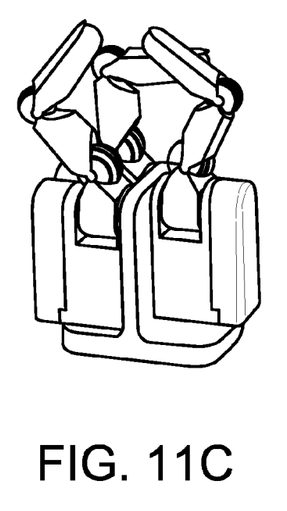
Figure 11D:
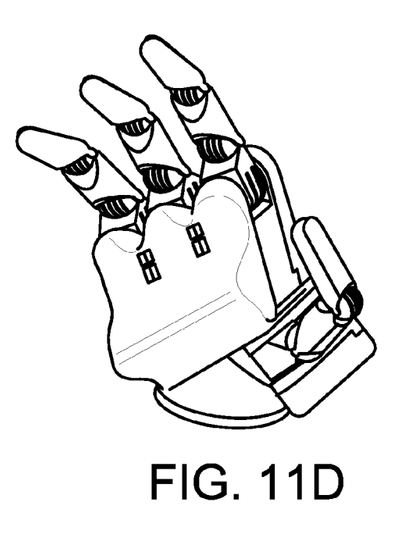
Figure 11E:
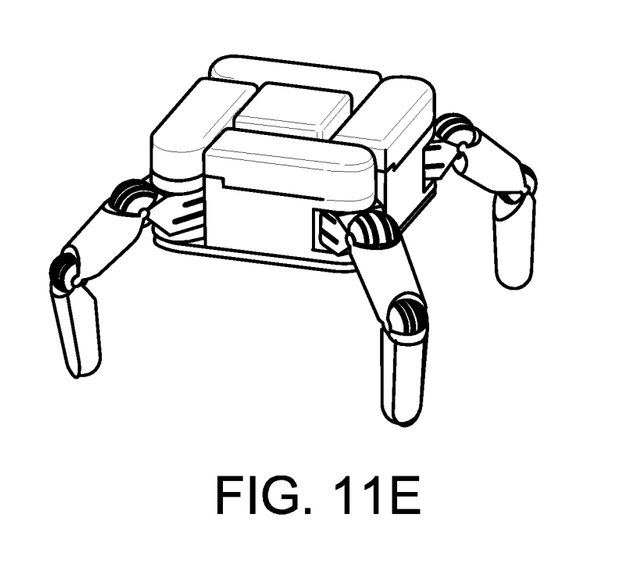
Figure 11F:
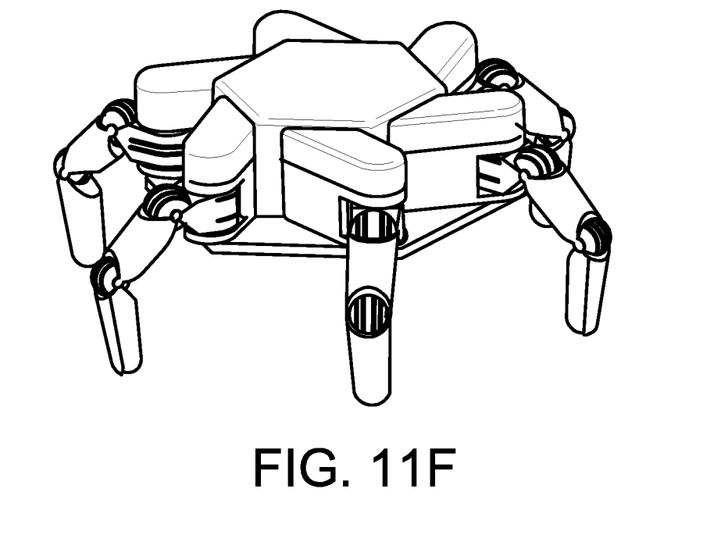

Now referring to FIG. 10, an exemplary transparent view depicting tensioning of a cable 1002 driven by the third rotating module 906 is illustrated. The cable 1002 is routed through the third joint 506. A tensioning mechanism 1004 includes a threaded extension 1006 and a nut 1008, wherein rotating the nut 1008 clockwise relative to the threaded extension 1006 causes tension in the cable 1002 to be increased, while rotating the nut 1008 counterclockwise relative to the threaded extension 1006 causes the tension in the cable 1002 to be decreased. The tensioning can be set prior to the third modular robotic finger 108 being deployed for use. In another exemplary embodiment, an actuator can be coupled to the nut 1008 such that tensioning can be modified as the third modular robotic finger 108 is used.

Referring collectively to FIGS. 11A-11F, various exemplary arrangements of modular robotic fingers attached to respective frames of different shapes is depicted. It is to be understood that the modular robotic fingers described herein are hot-swappable in nature, such that they can be replaced quickly and easily. Furthermore, other devices can be placed on a frame instead of modular robotic finger, such as a flashlight, scissors, screwdriver, etc. For purposes of disabling an IED, for example, the frame 102 can have a flashlight to provide light to a remote viewer (which can view images output by cameras in the frame 102), two modular robotic fingers attached to the frame 102 can be used to grasp a wire, and a pair of scissors connected to the frame 102 can be used to cut such wire. In other embodiments the modular robotic fingers themselves may include video cameras.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A robotic hand, comprising:
   a frame, comprising:
      a first receiving region, the first receiving region comprising first electrical contacts; and
      circuitry that is coupled to the first electrical contacts; and
   a modular robotic finger that is removably attachable to the frame at the first receiving region by way of a mechanical fuse, the modular robotic finger comprising:
      an actuator; and
      second electrical contacts, the first electrical contacts and the second electrical contacts forming an electrical connection between the circuitry in the frame and the actuator in the modular robotic finger when the modular robotic finger is attached to the frame at the first receiving region by way of the mechanical fuse, the circuitry transmitting a control signal to the actuator by way of the electrical connection, the actuator configured to cause at least a portion of the modular robotic finger to move responsive to receipt of the control signal, and wherein the mechanical fuse is configured to trip when a normal force between the frame and the modular robotic finger at the first receiving region exceeds a first threshold, causing the modular robotic finger to detach from the frame.

2. The robotic hand of claim 1, wherein the frame is in a shape of a human palm.

3. The robotic hand of claim 1, wherein the modular robotic finger further comprises:
   a base link comprising a front side and the actuator;
   a proximal link;
   a distal link;
   a first joint;
   a second joint; and
   a third joint;
   wherein the front side of the base link is received at the first receiving region of the frame, the base link is coupled to the proximal link by way of the first joint and the second joint, the proximal link is coupled to the distal link by way of the third joint.

4. The robotic hand of claim 3, wherein the base link further comprises a second actuator and a third actuator that are in electrical communication with the circuitry of the frame when the modular robotic finger is attached to the frame at the first receiving region by way of the mechanical fuse.

5. The robotic hand of claim 4, wherein the actuator, the second actuator, and the third actuator are first, second, and third motors, respectively, the first motor configured to facilitate adduction and abduction, the second motor configured to facilitate flexion and extension about the second joint, and the third motor configured to facilitate flexion and extension about the third joint.

6. The robotic hand of claim 5, wherein the first motor drives a first rotating module, wherein rotation of the first rotating module causes the proximal link to rotate about the first joint relative to the base link, the second motor drives a second rotating module that is coupled to first steel cabling, the first steel cabling coupled to the second joint, wherein rotation of the second rotating module causes the proximal link to rotate about the second joint relative to the base link, the third motor drives a third rotating module that is coupled to second steel cabling, the second steel cabling coupled to the third joint, wherein rotation of the third rotating module causes the distal link to rotate about the third joint relative to the proximal link.

7. The robotic hand of claim 6, the distal link comprising a sensor, the sensor electrically coupled to the second steel cabling, wherein the second steel cabling is configured to provide power to the sensor, and the second steel cabling is further configured to transmit data output by the sensor to the circuitry in the frame.

8. The robotic hand of claim 6, wherein the second rotating module and the third rotating module each comprise a respective planetary gearhead and a respective capstan formed on the respective planetary gearhead.

9. The robotic hand of claim 1, wherein the frame further comprises a plurality of cameras, the plurality of cameras electrically coupled to the circuitry.

10. The robotic hand of claim 9, wherein the frame further comprises a projector that outputs structured light towards an object, wherein the circuitry is configured to generate a three-dimensional point cloud based upon images of the object captured by the plurality of cameras.

11. The robotic hand of claim 1, the frame comprising a plurality of receiving regions, the robotic hand further comprising a plurality of modular robotic fingers that are respectively removably attachable from the plurality of receiving regions.

12. The robotic hand of claim 1, wherein the second electrical contacts are spring contacts.

13. The robotic hand of claim 1, wherein the mechanical fuse is magnetic, wherein the first receiving region comprises a first magnet having a first polarity, wherein the modular robotic finger comprises a base link that comprises a second magnet having a second polarity that is opposite the first polarity.

14. The robotic hand of claim 1, wherein the first receiving region comprises a recess and the modular robotic finger comprises a protrusion that generally conforms to the recess.

15. The robotic hand of claim 14, wherein the recess has a depth and sides having a slope relative to a planar surface of the recess, the depth and the slope selected such that the modular robotic finger detaches from the frame when a sheer force over a second threshold is applied between the modular robotic finger and the frame at the first receiving region.

16. The robotic hand of claim 1, wherein the frame comprises a second receiving region, the robotic hand further comprising a camera that is removably detachable from the frame at the second receiving region by way of a second mechanical fuse.

17. The robotic hand of claim 1, further comprising a wireless antenna that is configured to receive control commands from a remotely located control unit, wherein the control signal is based on the control commands.

18. A robotic hand, comprising:
  a frame, the frame comprising:
    first connecting means for connecting a modular robotic finger with the frame; and
    control means for controlling movement of the modular robotic finger;
  the modular robotic finger, the modular robotic finger being removably attachable to the frame, the modular robotic finger comprising:
    second connecting means for connecting the modular robotic finger with the frame;
    first actuator means for controlling adduction and abduction of the modular robotic finger;
    second actuator means for controlling flexion and extension of a first robotic link of the modular robotic finger; and
    third actuator means for controlling flexion and extension of a second robotic link of the modular robotic finger, wherein the first connecting means and the second connecting means act collectively as a mechanical fuse that is triggered when a normal force above a threshold is applied to the modular robotic finger where connected to the frame, causing the modular robotic finger to detach from the frame, and wherein the first actuator means, the second actuator means, and the third actuator means are controlled by the control means.

* * * * *